E. J. BENSON.
CHAIN TIGHTENING DEVICE.
APPLICATION FILED APR. 28, 1915.
1,160,823.
Patented Nov. 16, 1915.
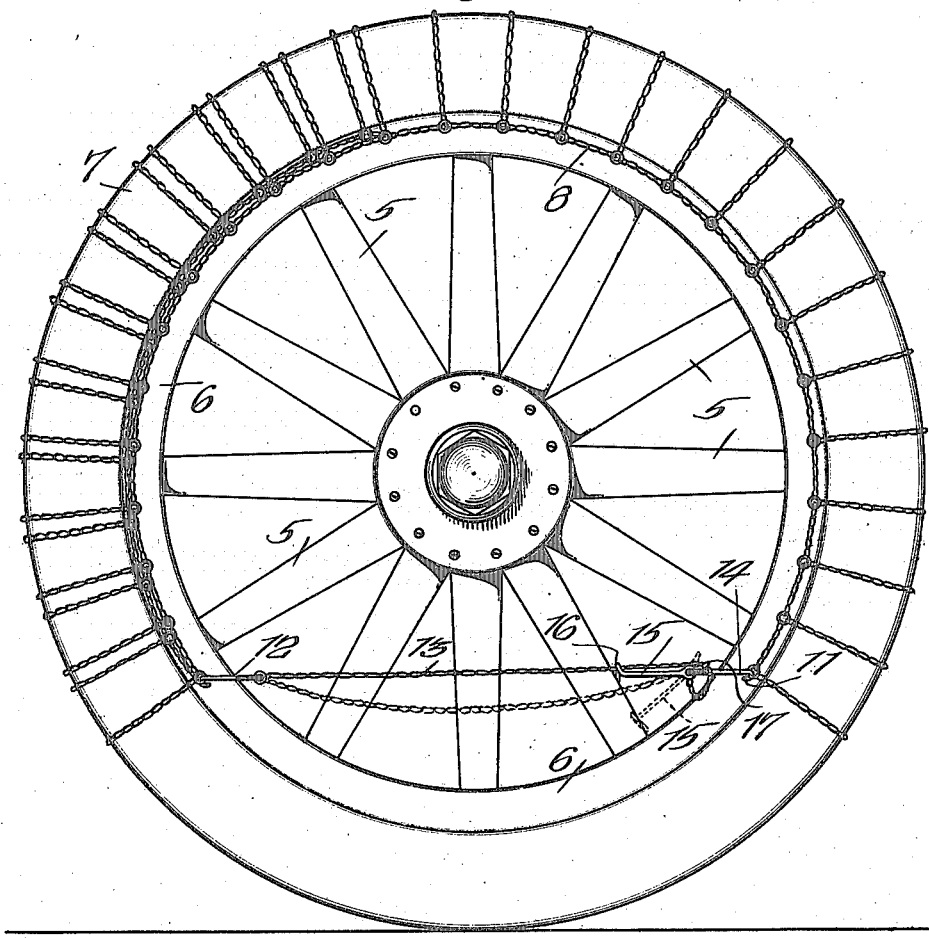
Fig. 1.
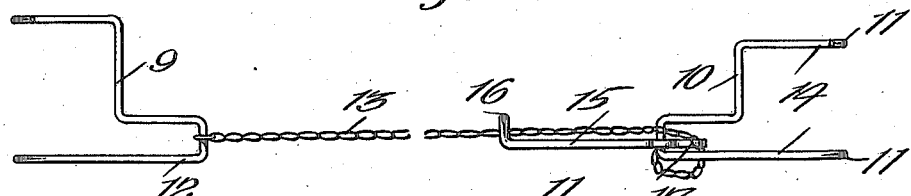
Fig. 2.
Fig. 3.
WITNESSES:
INVENTOR
ERNEST J. BENSON,
BY Munn & Co.
ATTORNEYS

UNITED STATES PATENT OFFICE.

ERNEST J. BENSON, OF BLACKFOOT, IDAHO, ASSIGNOR OF ONE-HALF TO CHARLES VERNON FISHER, OF BLACKFOOT, IDAHO.

CHAIN-TIGHTENING DEVICE.

1,160,823.

Specification of Letters Patent.

Patented Nov. 16, 1915.

Application filed April 28, 1915. Serial No. 24,439.

*To all whom it may concern:*

Be it known that I, ERNEST J. BENSON, a citizen of the United States, and a resident of Blackfoot, in the county of Bingham and State of Idaho, have invented a certain new and useful Improvement in Chain-Tightening Devices, of which the following is a specification.

This invention relates to an improvement in chain tightening devices, and one of the principal objects of the invention is to provide an improved means whereby a chain of the non-skid type may be tightened around a portion of the periphery of a wheel as in cases where the wheel is partially submerged in mud to such an extent as to render the placing of the chain entirely around the wheel impossible.

Another object of the invention is to provide a device of the class described consisting of a pair of clips adapted to be connected to a non-skid chain terminal on each side of the felly and being provided one with a flexible element in the form of a chain length and the other with a lever adapted to be engaged with the flexible element and to be moved in such manner as to tighten the same for drawing the clips toward each other and thus tighten the non-skid chain upon the wheel tire.

A still further object is to provide a device of the class described which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawing in which like characters of reference indicate like parts throughout the several figures, of which:

Figure 1 represents a view in elevation of an automobile wheel, showing the same equipped with a non-skid chain of ordinary construction, tightened upon the wheel by use of my improved device. Fig. 2 represents a plan view of the improvement. Fig. 3 represents a view in perspective of one of the clips and the tightening lever with which it is provided, showing the same as being in operative position.

Referring more particularly to the drawing, a wheel is indicated generally at 5 and is provided with a felly 6, the pneumatic tire with which the wheel is equipped being indicated at 7. A non-skid chain of ordinary well known type is indicated at 8.

The device forming the subject of the present invention, includes a pair of clips 9 and 10 which are made substantially alike, and which are each preferably formed of a length of stout wire bent into substantial U-shape and having its terminals provided with oppositely disposed hooks 11. Each of the clips is provided with a loop portion 12 offset to one side of the center of the clip, so that when the device is in use the flexible element or chain 13 carried by clip 9 may lie entirely on one side of the spokes of the wheel. The side members 14 of the clips are of a width apart substantially equal to, or slightly greater than, the width of the felly 6 of the wheel, so that the clips may straddle the felly when in position. The flexible element or chain 13 is connected at one end to the loop portion 12 of clip 9, the opposite end of the chain either being free or if desired being connected to the loop portion 12 of clip 10.

Pivoted near one end upon the loop portion 12 of clip 10, is a lever consisting of a shank 15 provided at its outer end with an offset right angularly extending hook 16, and being provided at its inner end with a curved arm or dog 17.

The device is intended primarily to be used in securing a chain of the non-skid type partially around the periphery of a wheel, as in cases where the wheel is submerged in mud or water to such an extent as to prevent the positioning of the chain entirely around the same. In operation the non-skid chain is placed upon the uppermost part of the wheel as indicated in Fig. 1, and the clips 9 and 10 are then connected to suitable links in the chain at the desired points on the periphery or relatively to the periphery of the wheel, in such manner that the hooks 11 engage the links in the non-skid chain, with the clips bridging or straddling the felly 6 of the wheel, and extending toward each other. When thus positioned the loops 12 extend to one side of the line of spokes, and the chain 13 also lies on the same side of the line of spokes with the loops 12. The lever being in the dotted line position indicated in Fig. 1, is then engaged by means of the arm or dog 17 with one of the links of the chain 13, after the latter has been stretched taut by the operator of the device, and said lever is then moved upwardly thus tightening the chain 13 and drawing the terminals of the non-skid chain toward each other, and in this manner tightening the non-skid chain. When the desired tension is obtained, the hook 16 provided on the lever is engaged over the flexible element 13 in the manner indicated, whereby to prevent accidental downward movement of the lever incident to the strain exerted thereupon by the chain 13. The surplus portion of the non-skid chain may be folded back as indicated in Fig. 1, and hooked into the suitable links at the desired portion of the non-skid chain.

By having the loop portions offset so as to position the chain 13 to one side of the line of spokes, there will be no danger of scratching or marring the surface of the spokes in attaching the device, or in operating the wheel while the device is in place.

It will be noted that by the use of my invention it is not necessary to jack the wheel up in order to attach the chain, and that the device is readily attachable from the outside of the wheel, so that no inconvenience may be experienced in securing the device in place. While the chain 13 is positioned on the outside of the spokes of the wheel, it will be noted that from the construction and arrangement of the clips 9 and 10, the pull imparted upon them through the action of the lever, will be transferred equally to both sides of the non-skid chain, that is, will be equally distributed on the portion of said chain lying on the outside and the portion lying on the inside of the wheel.

Although I have described the preferred embodiment of my invention, I may desire to make such changes in the construction, combination, and arrangement of parts thereof, as do not depart from the spirit of the invention, and the scope of the appended claims.

I claim:—

1. A device of the class described comprising a pair of substantially U-shaped clips provided with hooks adapted to engage the terminals of a section of non-skid chain and adapted to straddle the felly of a wheel on which said chain is carried, said clips being each provided with a looped portion offset to one side of the line of spokes, a flexible element carried by the looped portion of one clip, and a lever pivoted on the looped portion of the opposite clip and being provided at one end with an arm for engaging the flexible element, the opposite end of the lever being provided with a hook adapted when the lever is moved into position for tightening the flexible element to engage the latter for retaining the lever in position.

2. A device of the class described comprising a pair of clips adapted to straddle the felly of a wheel and to be connected with the terminals of a section of non-skid chain, a flexible element carried by one of the clips, and a lever pivotally connected with the other clip and adapted to engage said flexible element for tightening the latter whereby to tighten the non-skid chain upon a wheel, said lever being provided with means adapted to retain the lever in tightened position.

3. A device of the class described including a pair of substantially U-shaped clips provided with hooks adapted to engage the terminals of a section of non-skid chain, and adapted to straddle the felly of a wheel on which the chain is carried, said clips being each provided with a loop portion offset to one side of the line of spokes, and means connecting the loops and adapted to be operated at will for drawing the clips together whereby to tighten the non-skid chain upon the wheel.

ERNEST J. BENSON.

Witnesses:
 ELIZABETH FANELL,
 HANS VON LASTOWICKA.